C. M. MANLY.
ROLLER BEARING.
APPLICATION FILED JUNE 29, 1914.

1,185,225.

Patented May 30, 1916.

Witnesses:
Rupert E. Rundell
A. I. Miller

Inventor
Charles M. Manly
By his Attorney
W. B. Morton

UNITED STATES PATENT OFFICE.

CHARLES M. MANLY, OF FREEPORT, NEW YORK.

ROLLER-BEARING.

1,185,225.  Specification of Letters Patent.  Patented May 30, 1916.

Application filed June 29, 1914. Serial No. 847,963.

*To all whom it may concern:*

Be it known that I, CHARLES M. MANLY, a citizen of the United States, and resident of Freeport, county of Queens, and State of New York, have invented certain new and useful Improvements in Roller-Bearings, of which the following is a specification.

This invention relates to roller bearings for shafts, crank arms, etc., and has for its object to provide a bearing having a cage or separator which will maintain the rollers in proper parallelism and out of contact with one another under very heavy loads.

A further object of the invention is to provide a cage construction which may be made of light material but which will withstand to the highest degree the torsional strains due to the slight differences in the diameter of the rollers resulting from uneven wear, etc., which it is impossible to obviate.

A further object of the invention is to provide a cage of durable yet cheap construction in which the rollers may be easily and rapidly assembled, and which may be easily taken apart and reassembled to replace a defective roller.

Figure 1:
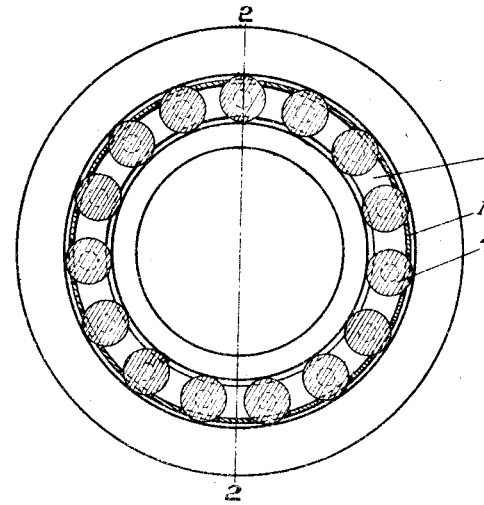
Figure 2:
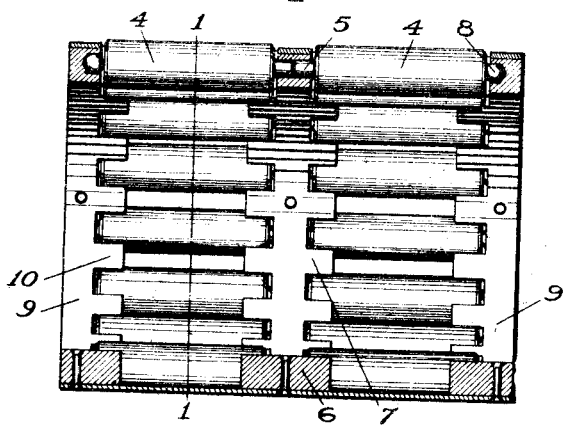
Figure 3:
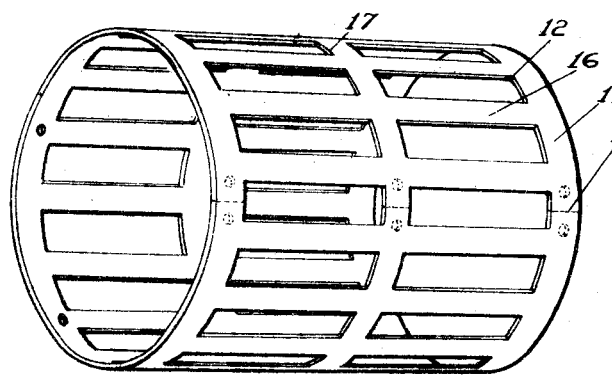

With the above objects in view my invention consists of the construction shown and described in the accompanying drawings and specification, and in the said drawings, Figure 1 is an end view section on line 1—1 of Fig. 2; Fig. 2 is a longitudinal vertical section on line 2—2 of Fig. 1; and Fig. 3 is a perspective view of a portion of the cage.

Referring now to the drawings, 4 indicates the bearing rollers, here shown as arranged in a double series each roller having on one end a reduced extension 5 supported in a hole of the ring 6 as shown in Fig. 2. The ring 6 is provided on each side with opposite extensions 7 spaced apart to receive the ends of the rollers, and having their longitudinal faces concave to loosely fit the periphery of the rollers. The projections 5 on the ends of the rollers of one series abut against the projections on the rollers of the other series, and the projections are long enough to maintain the end faces of the rollers out of engagement with the ring 6. The opposite ends of the rollers are smooth to provide bearing faces for engagement with suitable anti-friction balls 8 seated in pockets formed in the end rings 9 of the bearing cage. The rings 9 of the bearing cage are provided with extensions 10 similar to the extensions 7, whereby the rollers are maintained in parallelism at their outer ends. The three rings 9, 7, 9, are fastened together to form a single rigid cage by means of a slotted sleeve 11 shown detached from the bearing in Fig. 3. This sleeve may be formed of any suitable sheet metal either of a tube of proper diameter by slotting its periphery with two parallel series of alined slots 12, or may be cut out of a flat sheet of metal and then bent around the rings with its edges abutting as indicated at 13 in Fig. 3.

The slots in the sleeve 11 register with the rollers to permit the engagement of the roller with the inner face of the outer member of the bearing, which I have indicated at 14 in Fig. 1. It will be understood that the outer member 14 of the bearing and the inner member 15 are shown diagrammatically merely to indicate the two relative rotating parts between which the bearing is to be forced.

The sleeve 11 is attached to the separator rings by rivets, or otherwise, with the extensions 7 and 10 in alinement with each other. When it is desired to insert a new bearing in the roller it is merely necessary to punch out the rivets and slip the sleeve off of the rings. When the roller is replaced the sleeve may be riveted back in place. The only material strain to which the bearing cage as above described is subjected is the torsional strain resulting from the tendency of one portion of the roller to move around the inner member faster than the other end. In my improved bearing this strain is resisted by the full width of the webs 16 between the rollers and the integral connection of the webs and the rings 17 which surround and are fixedly attached to the separator rings 6 and 9. The cage is fully as strong as if the extensions 7 and 10 extended throughout the length of the roller and were rigidly fastened together, and at the same time is much lighter, cheaper to construct, and has much smaller area of rubbing engagement between the rollers and separators.

As shown my bearing is composed of two sets of rollers as such construction is desirable for bearings of any considerable length, as it is more difficult to grind a round roller of accurate diameter throughout, and such roller is more liable to uneven wear than a short roller. It is to be understood, however, that the inner ring 16 may be omitted if desired and rollers of double length substituted for the rollers shown.

Having described my invention, what I claim and desire to secure by Letters Patent is:

1. A roller bearing comprising a series of rollers, separator rings at each end of said rollers having extensions projecting between the ends of the adjacent rollers, and a sleeve surrounding said rings and attached thereto and having slots through which the bearing faces of the rollers project.

2. A roller bearing comprising a series of rollers, separator rings at each end of said rollers having extensions projecting between the ends of the adjacent rollers, and a sheet metal sleeve consisting of rings at each end surrounding the separator rings and attached thereto, and longitudinal webs extending between the rollers.

3. A roller bearing consisting of a series of rollers, a cage having rings at each end with separator fingers between the ends of said rollers, and flat longitudinal webs connecting said rings between said rollers and substantially filling the space between the bearing faces of said rollers.

4. A roller bearing consisting of a double series of parallel rollers, the middle separator ring having projections on each side between the adjacent rollers, and the end rings having projections on one side between the adjacent rollers, and an outer sleeve formed of a single piece of sheet metal having rings at each end and in the middle attached to said separator rings, and integral connecting webs extending between the rollers.

Signed at New York, in the county of New York and State of New York this 13th day of June, 1914.

CHARLES M. MANLY.

Witnesses:
A. I. MILLER,
RUPERT E. RUNDELL.